United States Patent
Brouhon

(10) Patent No.: US 7,792,365 B2
(45) Date of Patent: Sep. 7, 2010

(54) METHODS AND APPARATUS FOR GENERATING IMAGES

(75) Inventor: Patrick Brouhon, Saint Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 449 days.

(21) Appl. No.: 10/571,060

(22) PCT Filed: Aug. 27, 2004

(86) PCT No.: PCT/EP2004/051929

§ 371 (c)(1),
(2), (4) Date: Sep. 27, 2007

(87) PCT Pub. No.: WO2005/024702

PCT Pub. Date: Mar. 17, 2005

(65) Prior Publication Data

US 2008/0107342 A1    May 8, 2008

(30) Foreign Application Priority Data

Sep. 10, 2003    (GB) ................................ 0321169.5

(51) Int. Cl.
*G06K 9/46* (2006.01)
(52) U.S. Cl. ...................... 382/195; 235/494
(58) Field of Classification Search ................. 382/195; 235/494, 462

See application file for complete search history.

(56) References Cited

U.S. PATENT DOCUMENTS

| 4,514,622 | A | * | 4/1985 | Wevelsiep et al. ........... 382/181 |
| 4,988,852 | A | * | 1/1991 | Krishnan ................ 235/462.08 |
| 5,464,974 | A |   | 11/1995 | Priddy et al. |
| 5,845,008 | A | * | 12/1998 | Katoh et al. ................. 382/217 |
| 5,920,649 | A | * | 7/1999 | Yasuda et al. ............... 382/206 |
| 6,177,218 | B1 | * | 1/2001 | Felker et al. .................. 430/30 |
| 6,327,379 | B2 | * | 12/2001 | Matsuyama et al. ......... 382/144 |
| 6,590,996 | B1 | * | 7/2003 | Reed et al. ................... 382/100 |
| 6,627,888 | B2 | * | 9/2003 | Yamaguchi et al. ............ 850/5 |
| 6,643,400 | B1 | * | 11/2003 | Murakawa et al. .......... 382/195 |
| 6,964,374 | B1 | * | 11/2005 | Djuknic et al. ......... 235/462.01 |
| 7,400,769 | B2 | * | 7/2008 | Lapstun et al. .............. 382/187 |
| 7,439,505 | B2 | * | 10/2008 | Yamaguchi et al. ......... 250/310 |
| 2001/0012391 | A1 | * | 8/2001 | Matsuyama et al. ......... 382/145 |

(Continued)

FOREIGN PATENT DOCUMENTS

WO    WO 00/73887 A1    12/2000

(Continued)

OTHER PUBLICATIONS

The Aim Global Network, "Matrix Bar Code Symbologies", Oct. 20, 2002, pp. 1-2. www.aimglobal.ort/aimstore/mat.

*Primary Examiner*—Daniel G Mariam
*Assistant Examiner*—Aklilu k Woldemariam

(57) ABSTRACT

A method of generating an image comprising a position identifying pattern 6 and content 7 comprises the steps of: defining criteria relating to a region where the content and the pattern are superimposed, the criteria determining whether the pattern 6 will be distinguishable over the content 7 when applied to a product; identifying such a region 7 in the image; and selecting a characteristic of the pattern or the content in the region on the basis of the criteria, such that the image in the region meets the criteria.

20 Claims, 8 Drawing Sheets

U.S. PATENT DOCUMENTS

2001/0019109 A1* 9/2001 Yamaguchi et al. ......... 250/311
2004/0036924 A1* 2/2004 Ihara ......................... 358/3.28
2005/0052707 A1* 3/2005 Nelson et al. ............... 358/3.28

FOREIGN PATENT DOCUMENTS

| WO | WO 01/01670 A1 | 1/2001 |
| WO | WO 01/71644 A1 | 9/2001 |
| WO | 0175779 A1 | 10/2001 |
| WO | WO 03/012621 A1 | 2/2003 |

* cited by examiner

Fig 4
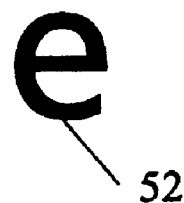
52
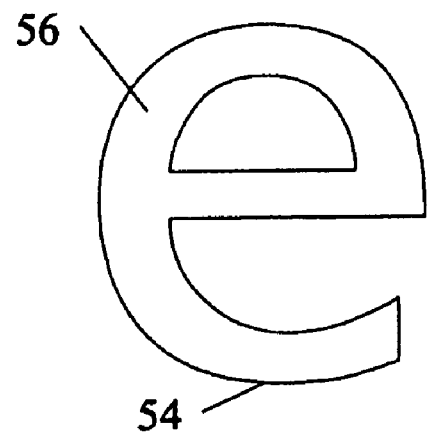
56
54
Fig 5
Fig 7
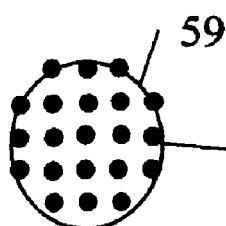
59
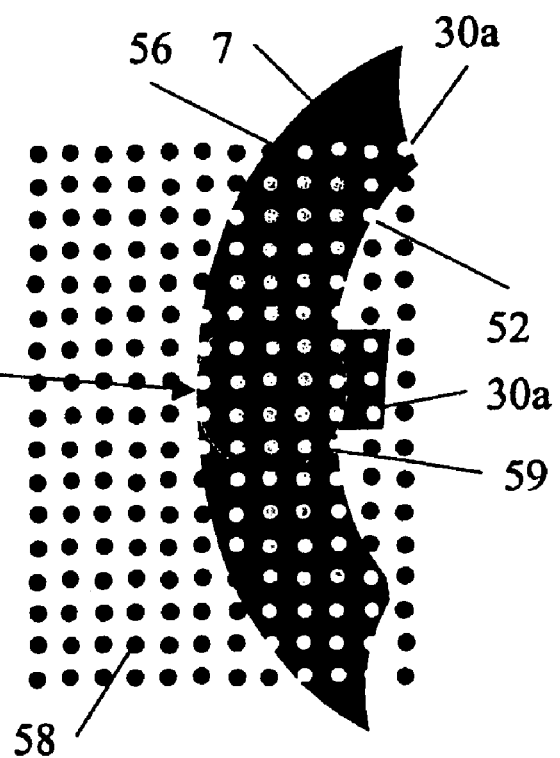
56  7  30a
52
30a
59
58
Fig 6

METHODS AND APPARATUS FOR GENERATING IMAGES

FIELD OF THE INVENTION

The present invention relates to methods and apparatus for generating images including a position identifying pattern, which can be detected by a suitable detection system. The pattern may be applied to a product such as a document, which may be a form, label or note pad, or any other form of product suitable for such marking, such as a packaging product.

BACKGROUND TO THE INVENTION

It is known to use documents having such position identification pattern in combination with a pen having an imaging system, such as an infra red camera, within it, which is arranged to image a small area of the page close to the pen nib. The pen includes a processor having image processing capabilities and a memory and is triggered by a force sensor in the nib to record images from the camera as the pen is moved across the document. From these images the pen can determine the position of any marks made on the document by the pen. The pen markings can be stored directly as graphic images, which can then be stored and displayed in combination with other markings on the document. In some applications the simple recognition that a mark has been made by the pen on a predefined area of the document can be recorded, and this information used in any suitable way. This allows, for example, forms with check boxes on to be provided and the marking of the check boxes with the pen detected. In further applications the pen markings are analysed using character recognition tools and stored digitally as text. Systems using this technology are available from Anoto AB and described on their website www.Anoto.com.

In order to allow documents to be produced easily with the position identifying pattern on them, it is desirable for the pattern to be suitable for printing on the types of printer that are readily available to a large number of users, such as an ink jet, laser jet or LEP printer. These are digital printers and typically have a resolution of 300, 600 or 1200 dots per inch, and the accuracy with which each dot can be located is variable. Also such printers are generally either monochrome, or, if they are colour printers, have only a small number of ink colours. Therefore, if it is desired to print position identifying pattern on a part of a product which has human visible content on it as well, it can be a problem to ensure that the position identifying pattern can be distinguished from the content by the reading device, and that the content remains clearly visible to the human eye.

SUMMARY OF THE INVENTION

According to a first aspect of the present invention, there is provided a method of generating an image comprising a position identifying pattern and content the method comprising the steps of: defining criteria relating to a region where the content and the pattern are superimposed, the criteria determining whether the pattern will be distinguishable over the content when applied to a product; identifying such a region in the image; and selecting a characteristic of the pattern or the content in the region on the basis of the criteria, such that the image in the region meets the criteria.

The criteria may comprise, for example, the contrast between the pattern and the content, the relative sizes of graphical elements making up the pattern and the content, or the types of ink or other marking material used to produce the pattern and the content on a product.

The characteristic of the pattern within the region may be selected depending on the density of the content within the region. The density may comprise an average density over a viewed area, which may be determined as a degree of covering of the region by a marking material. For example, where the content is to be applied as a grey scale, the density may be measured as the grey scale of the content. This is particularly applicable to monochrome printing methods. Where colour printing or marking methods are used for the content, the density may be defined as the average reflectivity of the defined content within a particular wavelength. For example if the pattern is to be produced in some regions using a marking material having a reflectivity in a particular wavelength, then the density can be defined as the average reflectivity of the content within that range of wavelengths. This will therefore be a measure of the visibility of the pattern to a reading device detecting light within that wavelength range if the pattern is produced using that marking material. Alternatively the density of the content may be measured as the total area of content elements per unit area of the image, and the density of the pattern elements may be measured as the total area of the pattern elements per unit area of the image.

Where the pattern is made up of pattern elements or areas, the characteristic may be the density of each of the pattern elements, which may be chosen so as to ensure there is sufficient contrast between the pattern and the content. For example the pattern elements may be selected to be high density, which may correspond to the pattern elements being substantially covered with marking material, when the image is applied to a product, or low density, which may correspond to the pattern elements being left substantially free of marking material, when the image is applied to a product.

The method may include selecting a size for the pattern elements, depending on whether the pattern area is low density or high density. This is desirable because with most printer technologies the marking material applied to the product will spread out of the areas which are nominally defined as being marked, into the areas which are nominally defined as being left unmarked. Therefore, if all pattern elements are defined as nominally being the same size, pattern areas formed by the application of marking material will in fact be larger than those formed by leaving a gap in the marking material. The sizes of the two types of pattern elements can therefore be defined to be different so that the pattern elements as produced, or reproduced, on a product, are approximately the same size.

The content within said region may be classified as high, low or intermediate density, and the method further comprise modifying the content in the intermediate density content regions to make it higher or lower density thereby to maintain contrast between the content and the pattern in the intermediate density regions.

The characteristic may be the density of the content, which can be limited to at least one predetermined range to maintain contrast between the content and the pattern within the region. This is useful, for example, where the image is applied to a product using a marking material, the marking material being the same for the pattern and the content.

Alternatively the characteristic of the content may be the nature of the marking material to be used when applying the content to a product. For example the marking material may be selected to be different from that selected for applying the pattern to the product. This may be particularly applicable for colour printers where the pattern may be applied as a black ink, and the content may be produced using only other colours if ink apart from black where it is superimposed on the pattern. The content can still, however, be produced using the black ink where there is no superimposition of pattern and content.

A corresponding system for generating an image is also provided according to a second embodiment of the invention. The system may include a marking device, such as a printer, arranged to apply the image to a product.

According to a third aspect of the invention there is provided an image having a plurality of regions, each region having content characteristics defining the content within it and pattern characteristics defining the pattern within it, wherein the pattern characteristics and the content characteristics are co-ordinated such that each region of the image meets predetermined criteria whereby the pattern is distinguishable over the content.

The image may be an electronically stored image, or it may be an image on a product, for example having been applied to the product using a marking material.

According to a further aspect of the invention there is provided a method of identifying a position identifying pattern on a product, the product having an image thereon including the position identifying pattern and a content feature, the method comprising the steps of: analysing regions of the image to classify them as either a high density region or a low density region, for either the high or low density regions inverting the image, and processing the image to identify the position identifying pattern.

A corresponding system is also provided.

The present invention further provides a data carrier carrying data arranged to control a computer system to operate as a system according to the invention, or to carry out the methods of the invention.

The data carrier can comprise, for example, a floppy disk, a CDROM, a DVD ROM/RAM (including +RW, -RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

BRIEF DESCRIPTION OF THE DRAWINGS

FIG. 4 shows a content feature on the document of FIG. 1;

FIG. 5 shows the outline of the content feature of FIG. 4;

FIG. 6 shows a portion of the content feature of FIG. 4 with position identifying pattern superimposed on it;

FIG. 7 shows an area of the position identifying pattern from FIG. 6;

DESCRIPTION OF THE PREFERRED EMBODIMENTS

Figure 1:
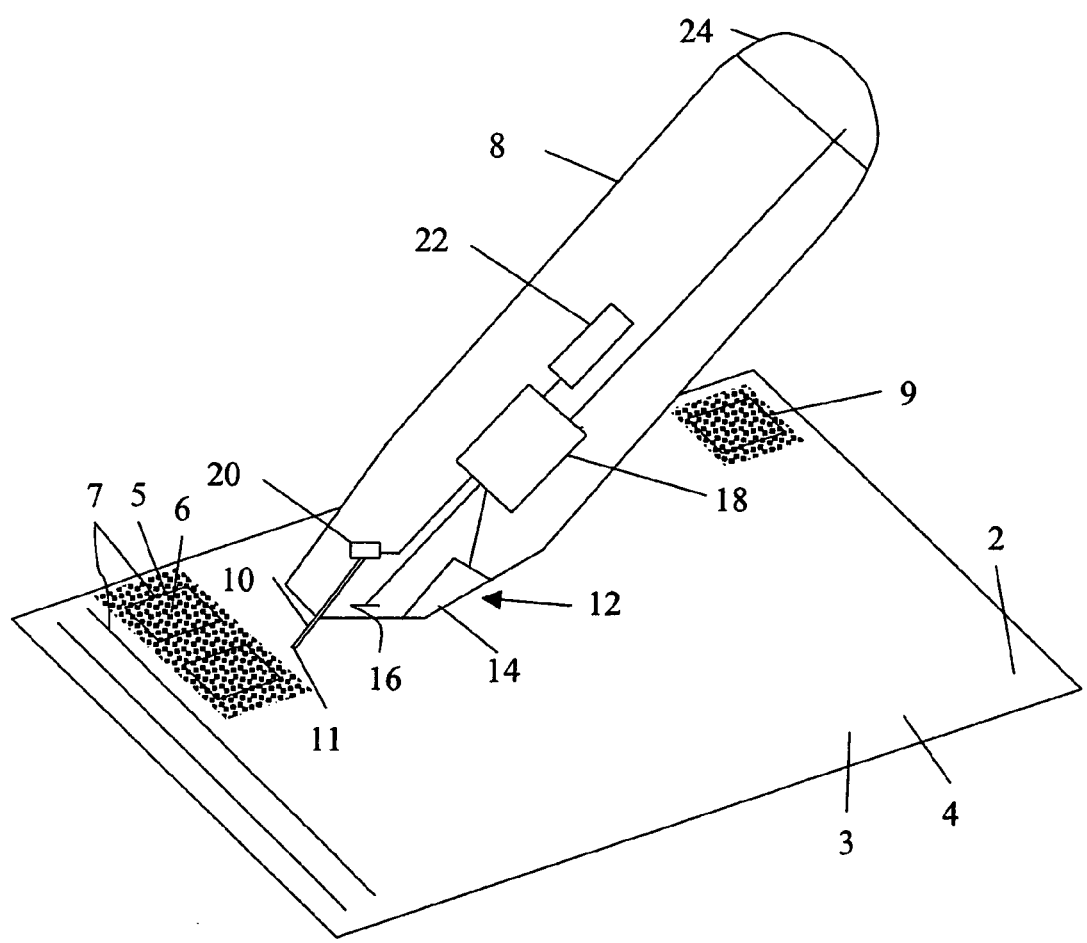
FIG. 1 shows a document according to an embodiment of the invention and a digital pen according to an embodiment of the invention.

Referring to FIG. 1, a document 2 according to the invention for use in a digital pen and paper system comprises a carrier 3 in the form of a single sheet of paper 4 with position identifying markings 5 printed on some parts of it. The markings 5, which are not shown to scale in FIG. 1, form a position identifying pattern 6 on the document 2. Also printed on the paper 4 are further markings 7 which are clearly visible to a human user of the document, and which make up the human visible content of the document 2. The content 7 is in the form of a number of lines and text and graphic features which extend over, and are therefore superimposed upon, the pattern 6.

The pen 8 comprises a writing nib 10, and a camera 12 made up of an infra red (IR) LED 14 and a CMOS sensor 16. The camera 12 is arranged to image a circular area adjacent to the tip 11 of the pen nib 10. A processor 18 processes images from the camera 12 taken at a predetermined rapid sample rate. A pressure sensor 20 detects when the nib 10 is in contact with the document 2 and triggers operation of the camera 12. Whenever the pen is being used on an area of the document 2 having the pattern 6 on it, the processor 18 can determine from the pattern 6 the position of the nib 10 of the pen whenever it is in contact with the document 2. From this it can determine the position and shape of any marks made on the patterned areas of the document 2. This information is stored in a memory 22 in the pen as it is being used. When the user has finished marking the document 2, this is recorded in a document completion process, for example by making a mark with the pen 8 in a send box 9. The pen is arranged to recognise the pattern in the send box 9 and send the pen stoke data to a pen stroke interpretation system in a suitable manner, for example via a radio transceiver 24 which provides a Bluetooth radio link with an internet connected PC. Suitable pens are available from Logitech under the trade mark Logitech Io.

Figure 2:
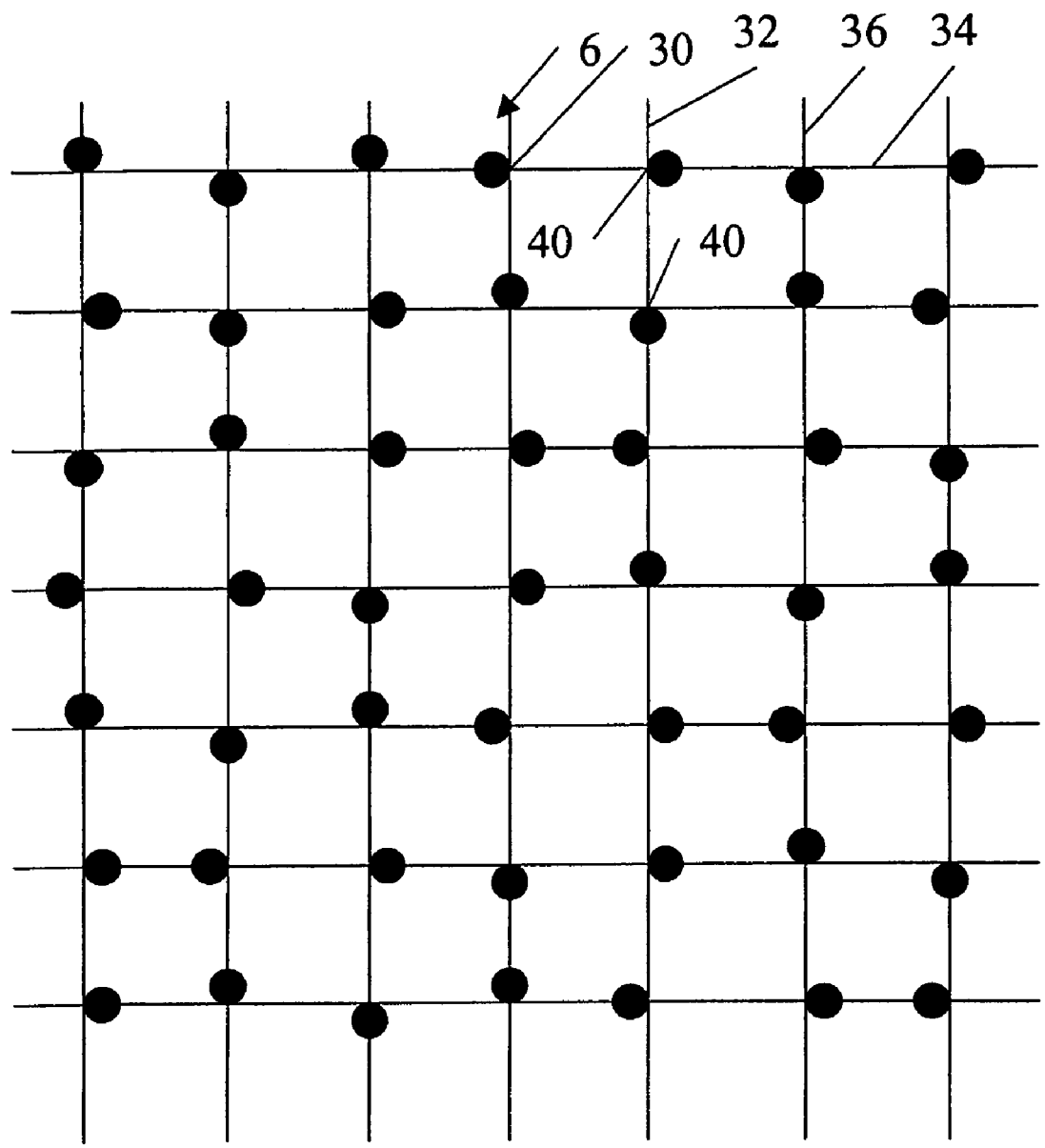
FIG. 2 shows a part of a position identifying pattern on the document of FIG. 1.

Referring to FIG. 2, the position identifying pattern 6 is made up of a number of graphical elements comprising black ink dots 30 arranged on an imaginary grid 32. The grid 32, which is shown in FIG. 2 for clarity but is not actually marked on the document 2, can be considered as being made up of horizontal and vertical lines 34, 36 defining a number of intersections 40 where they cross. The intersections 40 are of the order of 0.3 mm apart, and the dots 30 are of the order of 100 ?m across. One dot 30 is provided at each intersection 40, but offset slightly in one of four possible directions up, down, left or right, from the actual intersection 40. The dot offsets are arranged to vary in a systematic way so that any group of a sufficient number of dots 30, for example any group of 36 dots arranged in a six by six square, will be unique within a very large area of the pattern. This large area is defined as a total imaginary pattern space, and only a small part of the pattern space is taken up by the pattern on the document 2. By allocating a known area of the pattern space to the document 2, for example by means of a co-ordinate reference, the document and any position on the patterned parts of it can be identified from the pattern printed on it. An example of this type of pattern is described in WO 01/26033.

The content 7 is made up a number of different features which are printed as grey scale on the document 2. Therefore there are some pale grey areas where the content is of a light shade of grey, some dark grey areas where the content is of a dark shade of grey, and some very dark or black areas where the content is essentially solid black. In order to ensure that the pattern 6 is visible to the pen 8 in all regions of the document 2, the way in which the content 7 and the pattern 6 are printed at each point on the document 2 is selected depending on the characteristics of the content 7.

Figure 3:
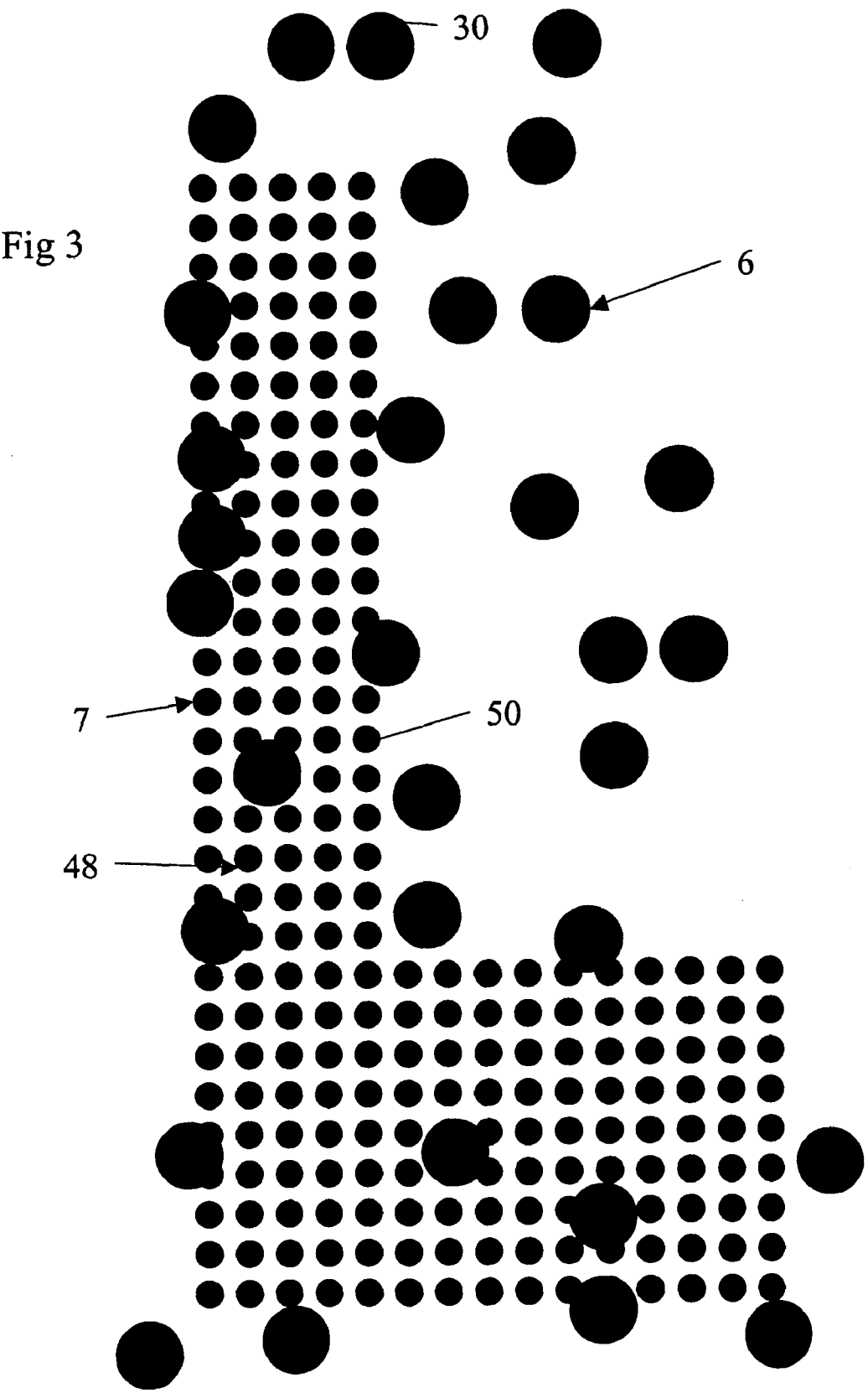
FIG. 3 shows a part of the position identifying pattern of the document of FIG. 1 with a content feature superimposed thereon.

Referring to FIG. 3, the content markings 7 are made up of a regular square array of discrete content dots 50 each of which is significantly smaller in both the horizontal and vertical dimensions, and in area, than each of the pattern dots 30. In this case the content dots 50 are each formed from a single dot of a 1200 dpi printer, and each dot is separated from the adjacent dots 50, both vertically and horizontally, by a space equivalent to the size if one single printer dot. They therefore have a nominal diameter of 21 ?m, and are spaced apart at intervals of twice their diameter, i.e. 42 ?m. If the content dots 50 were exactly circular and had a diameter of exactly 21 ?m, then the content dots 50 would cover about 20% of the area to which they are applied, the spaces between them would make up the other 50%. In practice, each printer dot is arranged to be larger in diameter than the spacing between the dot centres, so as to ensure that total coverage is achieved in a black area where all of the dots are applied. Therefore the coverage produced by the content dots 50 will be higher than 20%. Assuming the pattern dots are 100 ?m in diameter, they cover about 9% of the area to which they are applied. This means that, to the human eye, the content is clearly visible and distinguishable as a darker shade of grey over the position identifying pattern.

Referring to FIGS. 4, 5 and 6, where the content is essentially black, the pattern 6 is inverted and is formed as a number of white dots on the black content. In this example the content is a black letter 'e' 52 as shown in FIG. 4. This content letter 52 can be considered as defined by an outline 54, as shown in FIG. 5, the area 56 within the outline 54 being solid black. As shown in FIG. 6, where the pattern 6 is superimposed on the letter 52, the pattern is formed as a number of white dots 30a on the black letter 52. The dots are therefore formed by the absence of ink within an area 56 which is otherwise substantially covered with ink. The outline 54 forms a border between the content area 56 where the pattern 6 is formed as white dots, and the background area 58 where the pattern is formed as normal as black dots 30 of ink.

Figure 8:
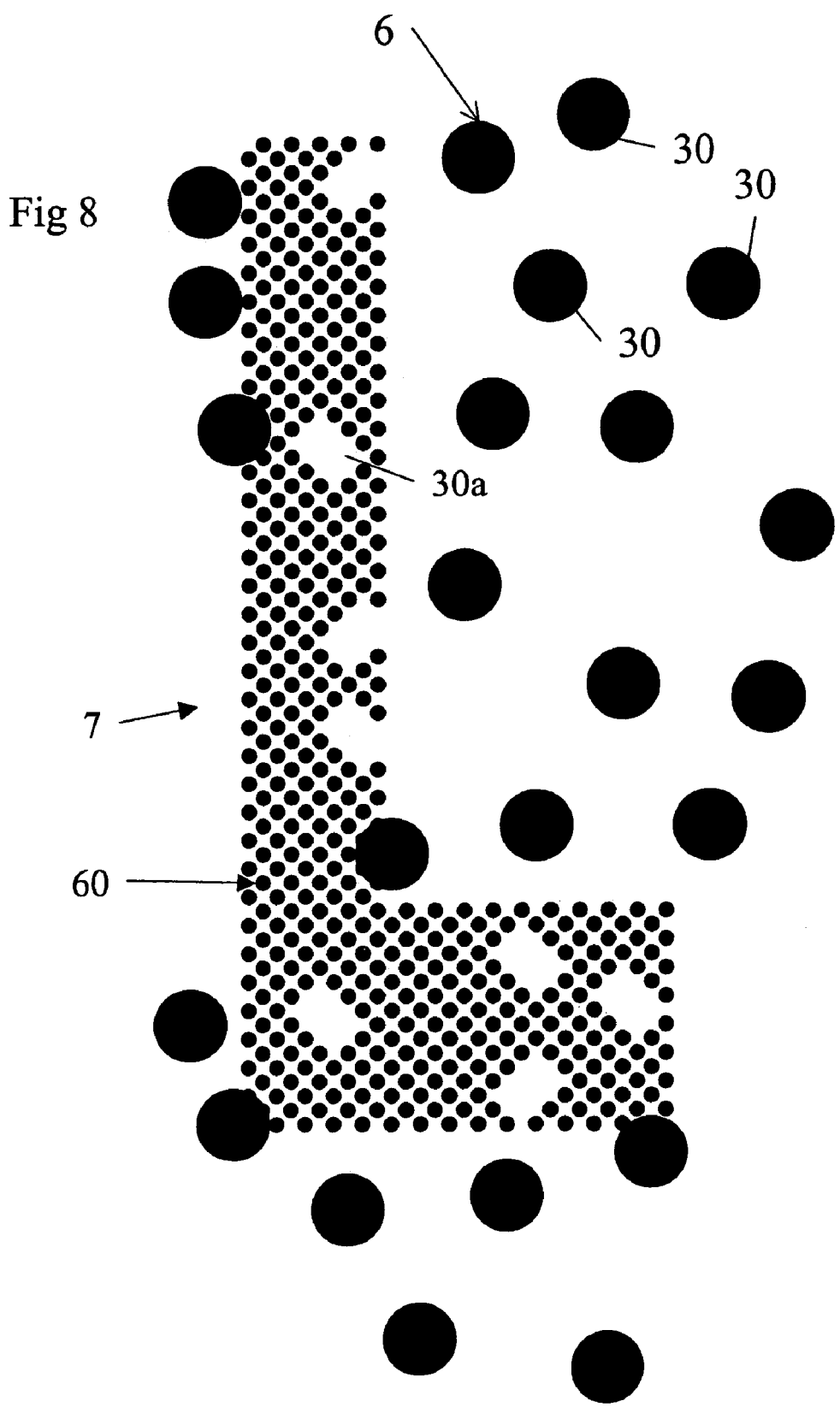
FIG. 8 is an enlarged view of another area of the document of FIG. 1.

Referring to FIG. 8, in a dark grey area 60 of content, the content is formed as a number of individual content dots 50 in the same manner as in the light grey content area of FIG. 3. However, in this case the content dots are closer together covering about 50% of the document surface. In this case the content dots within the dark grey area 60 are again formed by the absence of any ink, in a similar manner to that shown in FIG. 6. However, in this case each of the pattern dots 30a is not completely surrounded by black ink, but rather is surrounded by the content dots 50 which have spaces between them. However the contrast between the white pattern dots 30a and the surrounding areas of content dots 50 is greater than the contrast would be if the black pattern dots 30 were superimposed on the dark grey content 60. In the background areas around the dark grey content 60, black pattern dots 30 are used as normal.

Figure 9:
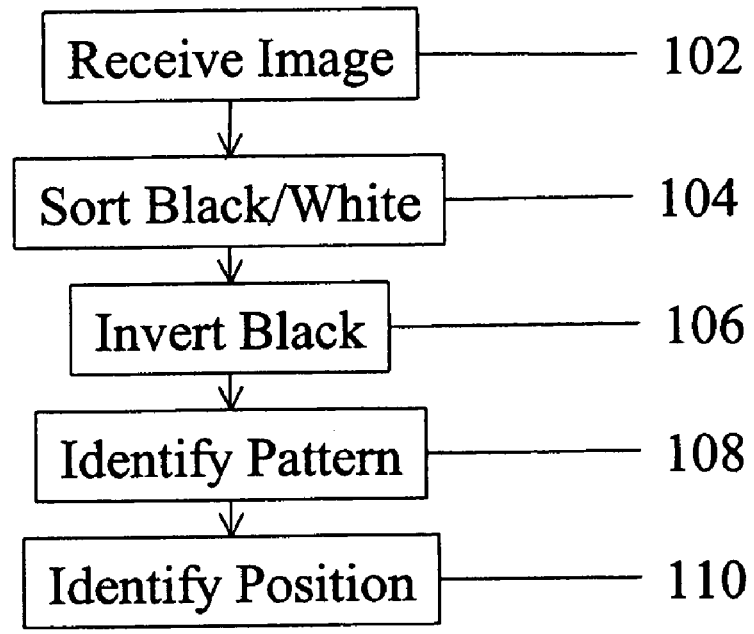
FIG. 9 is a flow diagram showing a process for reading the pattern on the document of FIG. 1.

Referring back to FIG. 9, each time the camera 12 records a digital image of part of the document 2, the processor 18 in the pen 8 receives the digital image at step 102. Assuming the imaged area is one where the pattern 6 and content 7 are superimposed, the image will include both the pattern and the content. Then at step 104 the processor analyses the image to identify macroscopic regions within it that are predominantly black and macroscopic regions that are predominantly white. For example a suitable cut off point might be whether more or less than 50% of the area is covered with ink. For regions that are predominantly white, the pattern dots 30 will be black. For regions that are predominantly black the pattern dots 30a will be white. Therefore at step 106 the processor inverts any macroscopic regions of the image which are predominantly black, so that the pattern dots will be black in those regions also. Then at step 108 the processor analyses the inverted, or partially inverted, image to identify the position of all of the pattern dots 30, 30a in the normal way so that, at step 110, it can identify its position on the document 2. For example referring to FIG. 6, the image of the area 59, which has black content and white pattern dots 30a in it, will be inverted to produce an image as shown in FIG. 7, in which the pattern dots are black and the content, which forms a background to the pattern dots 30a, is inverted to white.

The processor 18 can identify the pattern dots 30 in the inverted image provided they are within a predetermined size range, have at least a predetermined contrast with the background, defined as the relative level of absorption of light within a specific range of infer-red wavelengths, and are spaced apart with a grid spacing that is within a predetermined range. Therefore, within the light grey content areas 48, because the content dots 50 are considerably smaller than the acceptable range of pattern dot sizes, and have a completely different spacing from the pattern dots 30, and produce a light enough grey scale to maintain sufficient contrast with the pattern dots 30, the pen can still identify the pattern dots 30 where the content 7 is superimposed on the pattern. The density, or grey scale, of the content in the light grey areas can vary up to a certain limit, above which the pen 8 is unable to reliably read the pattern 7. Using the normal grey scale where 0 represents black and 255 represents white, a grey scale of from 255 down to about 200, which represents about 30% coverage of black ink on a white carrier, can be used with the pen 8.

In the substantially black areas 56 the contrast between the pattern dots 30a and the content 54 is very high in the original image and is therefore also very high in the inverted image. Therefore the processor 18 can easily identify the positions of the pattern dots 30a in these areas.

In the dark grey areas 60, the inverted image is similar to the original image in the light grey areas 48. Therefore the processor can again locate the pattern dots 30a provided there is sufficient contrast between the dark grey content 60 and the white pattern dots 30a. Therefore provided the dark grey content area 60 is at least about 70% covered with ink, the pattern dots can be identified.

It will be appreciated that, in the example above, there are certain ranges of grey scale on which the pattern cannot be printed so that it can be identified by the pen 8. Clearly one way of overcoming this problem would be to increase the resolution of the camera 12 in the pen and the power of the processor 18 so that the pattern dots could be distinguished over a greater range of content grey scales. However, another method, which will be described in more detail below, is to ensure, when printing the document, that the grey scale of the content is always within the acceptable ranges.

Figure 10:
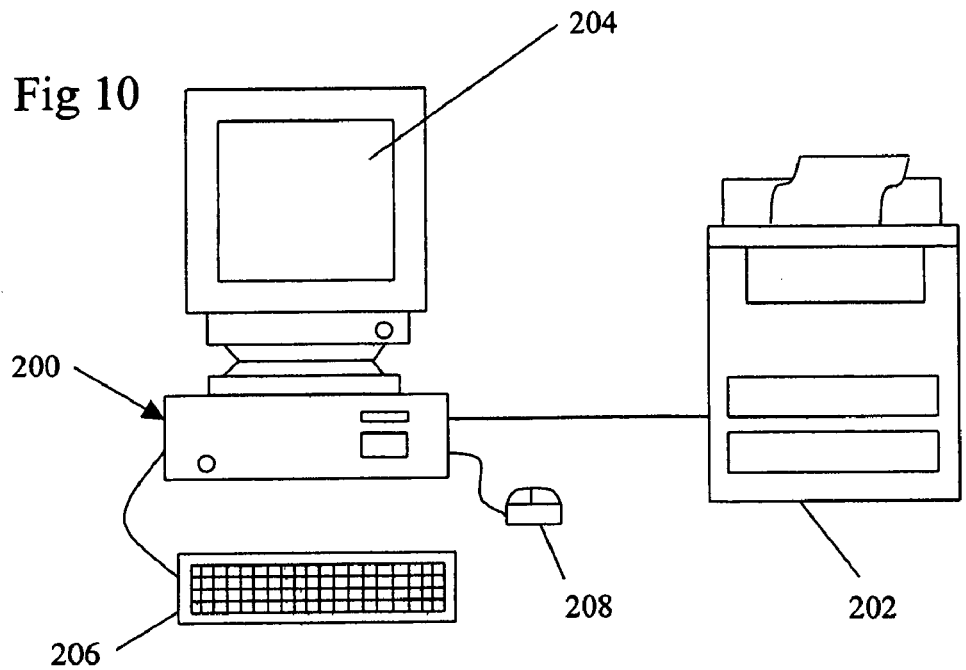
FIG. 10 shows a system according to an embodiment of the invention for printing the document of FIG. 1.
Figure 11:
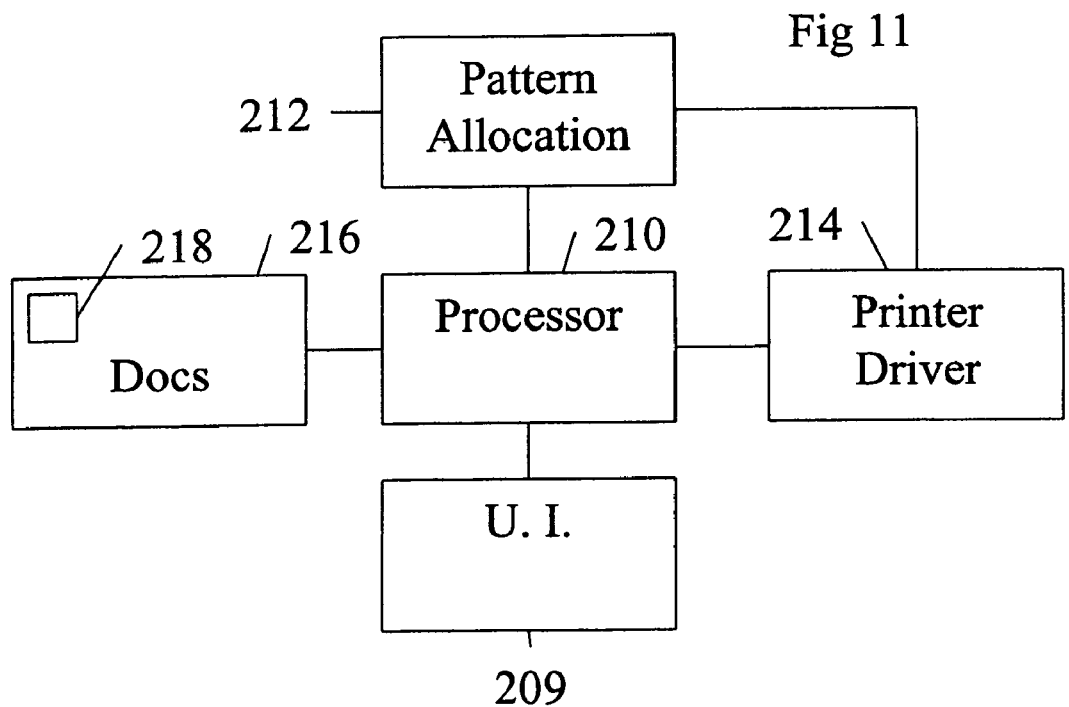
FIG. 11 shows some of the functional units within the computer of the system of FIG. 10.

Referring to FIGS. 10 and 11, a very simple system for producing printed documents having the position identifying pattern on them comprises a personal computer (PC) 200 and a printer 202. The PC 200 has a screen 204, a keyboard 206 and a mouse 208 connected to it to provide a user interface 209 as shown generally in FIG. 11. As also shown in FIG. 11, the PC 200 comprises a processor 210 and a pattern allocation module 212 which is a software module stored in memory. The pattern allocation module 212 includes a definition of a total area of pattern space and a record of which parts of that total area have been allocated to specific documents, for example by means of coordinate references. The PC 200 further comprises a printer driver 214, which is a further software module, and a memory 216 having electronic documents 218 stored in it. The user interface 209 allows a user to interact with the PC 200.

The printer 202 can be any printer which has sufficient resolution to print the pattern dots 30 and the content dots 50. In this case it is a 1200 dots per inch (dpi) monochrome laser jet printer. It will be appreciated that the dimensions of the content dots 50 correspond to the dimensions of single dots of ink from a 1200 dpi printer, and that the spacing between the content dots 50 is twice the spacing of the printer dots. This enables the printer to print the content dots 50 as single ink dots and the pattern dots 30 as groups of ink dots, for example about 12 dots. The printer dots are not circular but each comprise an irregular mark of ink on the document 2. However the exact shape of the content dots 50 is not important as the human eye cannot see their shape, and the pattern dots 30, because they are made up of a group of printer dots, are close enough to a regular shape to be read by the pen 8. Because they can be distinguished by the pen 8 by virtue of their size, the pattern dots 30 and content dots 50 can be printed using the same type of ink from the monochrome printer.

Figure 12:
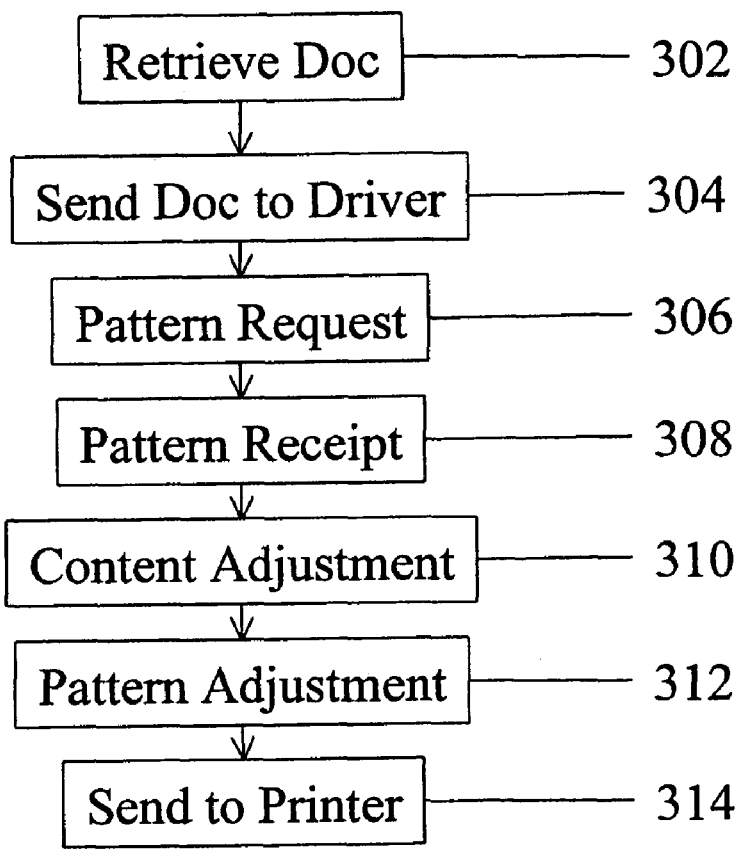
FIG. 12 is a flow diagram showing a method of producing the document of FIG. 1.

Referring to FIG. 12 in order to produce the printed document 2 the processor 210 retrieves an electronic document 218, which may be in the form of a PDF file, from the memory 216 at step 302 and sends it to the printer driver at step 304. The electronic document 218 contains a definition of the content 7, and the areas of the document 2 which are to have the pattern 6 printed on it. At step 306 the printer driver 214 requests the required amount of pattern from the pattern allocation module 212 which allocates by means of coordinate references an area of the pattern space to the document, generates the pattern 6 for that area using a pattern generation algorithm, and communicates the details of the pattern including the positions of all the required dots, back to the printer driver 214, which receives it at step 308. The printer driver 214 then combines the content 7 and the pattern 6 into a single file, which is typically a post script file, but may be a modified PDF file.

Then in a content adjustment step 310 it analyses the pattern areas to identify those of them that have content which is darker than 70% grey, those that have content which is between 50% grey and 70% grey, those that have content which is between 50% grey and 30% grey, and those that have content which is lighter than 30% grey, which will include the areas with no content. In those areas that are lighter than 30% grey, the printer driver 214 leaves the pattern and the content as they are and prints the pattern as black dots 30. For areas between 50% grey and 30% grey it recognizes that the pattern 6 in these areas could not be read either as black dots or white dots, and it therefore modifies the content so that it is lighter, in this case just less than 30% grey. For areas that are between 50% grey and 70% grey, the printer driver identifies that the pattern in these areas could not be read either as black dots or white dots, and it therefore modifies the content to make it darker, in this case slightly darker than 70% grey. Finally for the areas that are darker than 70% grey it recognizes these as areas where the pattern could be read as white dots, and leaves the content as it is.

Next, in a pattern adjustment step 312 the printer driver 214 selects all of the pattern areas which are lighter than 30% grey and identifies these as areas in which the pattern dots 30 are to be printed as black dots. It also selects all of the areas which are darker than 70% grey, which is all the remaining areas as a result of the content adjustment step, and identifies these as areas in which the pattern dots 30a are to be left as unmarked areas on the documents.

For areas where the pattern is to be left as unmarked areas the printer driver then adjusts the size of the white pattern dots that it requests the printer to produce to be larger than the corresponding black pattern dots. The reason for this is as follows. When the postscript file is sent to the printer it defines the areas of the document 100 which are to have ink applied to them and those which are to be left unmarked. However, this definition needs to take account of the fact that the marking material, e.g. ink or toner, is applied to the document in dots. In order to ensure that any area of a document can be printed as solid or pure black, the area covered by each of the printer dots must be at least a minimum size to ensure that there are no gaps between adjacent printer dots. For example in a 1200 dpi printer the dot spacing is about 21 μm, and each dot therefore needs to be greater than 21 μm in diameter. Therefore when a pattern dot of a certain size is requested by the printer driver, the printer will produce a dot of a slightly larger size, as it will spread into the surrounding region which is nominally defined as being left white. When a white dot 30a of a certain size, surrounded by black content, is requested of the printer, the resulting white dot will actually be slightly smaller than the requested size, because the marking material from the surrounding content will spread into the white dot area. Therefore, in order to ensure that the black and white pattern dots are of approximately the same size when printed, the printer driver needs to request the white dots to be larger than the black dots. The printer driver therefore adjusts the size, as requested from the printer, of any pattern dots 30a which are inverted so as to be larger than the equivalent black dots 30. It does this by reducing the area of the surrounding content, which will be printed as black, so that the area left unprinted, i.e. the white pattern dot 30a will be of the desired size.

Finally at step 314 the printer driver 214 converts the content 7 and the pattern 6 to a format, such a as a postscript file, suitable for the printer 202, and sends it to the printer which prints the content 7 and the pattern 6 simultaneously in a one-pass process.

In practice the various components of the system can be spread out over a local network or the internet. For example the pattern allocation module 212 can be provided on a separate internet connected server so that it can be accessed by a number of users.

While the use of a 1200 dpi printer is described above, a similar result can also be achieved with lower resolution printers, such as 600 dpi printers. For a 600 dpi printer, the approximate diameter if each ink dot is 42 ?m. This is therefore still well below the minimum diameter for a dot that will be recognized by the pen 8 as a pattern dot. Therefore if the content is printed as single, spaced apart ink dots from a 600 dpi printer, and the pattern dots are printed as groups of ink dots, for example three or four adjacent dots, then the content and pattern can be printed simultaneously on a 600 dpi printer. Again the grey scale of the content dots needs to be kept at such a level that it will not interfere with the pens ability to identify the pattern dots. A maximum of about 30% grey has been found to work with the Logitec Io™ pen.

Although the examples described above relate to monochrome printers, the invention is also applicable to colour printers. Typically a colour printer, such as a colour laser jet printer, has a number of coloured inks such as cyan, magenta and yellow and a black ink which is carbon based. The black carbon based ink reflects well at IR wavelengths and therefore needs to be used for the position identifying pattern if the pen uses IR wavelengths to detect it. For areas of black content, the black ink can be used, or a composite black can be formed by applying the cyan, magenta and yellow inks in the correct proportions. In regions of the document where there is no pattern, it is preferable to print black content with the black ink, as this uses less ink and gives a purer black than using a composite black. Where the pattern needs to overlap with black content there are two options. The content can be printed with the black ink and the pattern formed as white dots on the black content, as shown in FIG. 6 above. This has the advantage that the coloured inks are not used up on large areas of black content. Alternatively the black content can be formed from a composite black made up of the coloured inks and the pattern formed using the black ink. In this case while the pattern will be largely invisible to the human eye, the difference in IR reflectance between the black ink and the coloured inks making up the composite black will enable the pen 8 to detect the pattern. Either of these methods can be used.

The invention claimed is:

1. A method of generating an image comprising a position identifying pattern and content, the method comprising the steps of:
   defining criteria relating to a region where the content and the pattern are superimposed, the criteria determining whether the pattern will be distinguishable over the content when applied to a product;
   with a printer client comprising a computer, identifying such a region in the image; and
   with the printer client, selecting a characteristic of the pattern or the content in the region identified by the printer client on the basis of the criteria, such that the image in the region meets the criteria.

2. A method according to claim 1 wherein the characteristic is a characteristic of the pattern.

3. A method according to claim 2 wherein the characteristic of the pattern within the region is selected depending on the density of the content within the region.

4. A method according to claim 3 wherein the pattern is made up of a plurality of pattern elements and the characteristic is the density of each of the pattern elements.

5. A method according to claim 4 wherein the density of each of the pattern elements is selected a high density and a low density.

6. A method according to claim 5 wherein the high density corresponds to the pattern elements being substantially covered with marking material, when the image is applied to a product.

7. A method according to claim 5 wherein the low density corresponds to the pattern elements being left substantially free of marking material, when the image is applied to a product.

8. A method according to claim 7 including defining a size of each of the pattern elements, the size depending on whether the pattern element is high density or low density.

9. A method according to claim 4 further comprising classifying the content within the region as high density or low density, and selecting the low pattern element density if the content is high density, and the high pattern element density if the content is low density.

10. A method according to claim 9 wherein the content within said region is classified as high, low or intermediate density, and the method further comprises modifying the content in the intermediate density content regions to make it higher or lower density thereby to maintain contrast between the content and the pattern in the intermediate density regions.

11. A method according to claim 1 wherein the characteristic is a characteristic of the content.

12. A method according to claim 11 wherein, the characteristic is the density of the content, which is limited to at least one predetermined range to maintain contrast between the content and the pattern within the region.

13. A method according to claim 1 wherein the image is applied to a product using a marking material, the marking material being the same for the pattern and the content.

14. A method according to claim 11 wherein the characteristic of the content is the nature of the marking material to be used when applying the content to a product.

15. A method according to claim 14 wherein the marking material is selected to be different from that selected for applying the pattern to the product.

16. A method according to claim 1 further comprising applying the image to a product.

17. A method according to claim 16 wherein the pattern and the content are applied to the product in a one-pass process.

18. A method according to claim 16 wherein the pattern and the content are applied to the product by a printer.

19. A non-transitory computer program stored on computer readable medium generating an image comprising a position identifying pattern and content, comprising:
   a computer usable medium having computer usable program code embodied therewith, the computer usable program code comprising:
   computer usable program code configured to define criteria relating to a region where the content and the pattern are superimposed, the criteria determining whether the pattern will be distinguishable over the content when applied to a product;
   computer usable program code configured to identify such a region in the image; and
   computer usable program code configured to select a characteristic of the pattern or the content in the region on the basis of the criteria, such that the image in the region meets the criteria.

20. A printer client comprising a processor for producing documents comprising:
   a pattern allocation module configured to allocate an area of pattern space to the document and generate position identifying pattern for that area using a pattern generation algorithm; and
   a printer driver configured to combine content and the position identifying pattern into a single file,
   in which the printer driver is configured to identify a region where the content and the position identifying pattern are superimposed, and select a characteristic of the position identifying pattern or the content in the region on the basis of criteria for determining whether the position identifying pattern will be distinguishable over the content when applied to a product, such that the image in the region meets the criteria.

* * * * *